United States Patent
Raemakers-Franken et al.

(10) Patent No.: US 10,584,230 B2
(45) Date of Patent: Mar. 10, 2020

(54) FLAME-RETARDANT POLYAMIDE COMPOSITION

(71) Applicant: DSM IP ASSETS B.V., Heerlen (NL)

(72) Inventors: Petronella Catharina Raemakers-Franken, Echt (NL); Josien Krijgsman, Echt (NL); Renier Henricus Maria Kierkels, Echt (NL)

(73) Assignee: DSM IP Assets B.V., Heerlen (NL)

( * ) Notice: Subject to any disclaimer, the term of this patent is extended or adjusted under 35 U.S.C. 154(b) by 87 days.

(21) Appl. No.: 15/033,954

(22) PCT Filed: Nov. 19, 2014

(86) PCT No.: PCT/EP2014/074969
§ 371 (c)(1),
(2) Date: May 3, 2016

(87) PCT Pub. No.: WO2015/075049
PCT Pub. Date: May 28, 2015

(65) Prior Publication Data
US 2016/0355667 A1    Dec. 8, 2016

(30) Foreign Application Priority Data
Nov. 21, 2013  (EP) .................................. 13193877

(51) Int. Cl.
*C12P 7/02*     (2006.01)
*C08K 5/3492*   (2006.01)
*C08L 77/06*    (2006.01)
*C08K 5/5313*   (2006.01)
*C08K 7/14*     (2006.01)

(52) U.S. Cl.
CPC ........ *C08K 5/34922* (2013.01); *C08K 5/5313* (2013.01); *C08K 7/14* (2013.01); *C08L 77/06* (2013.01); *C08K 2201/019* (2013.01)

(58) Field of Classification Search
None
See application file for complete search history.

(56) References Cited

U.S. PATENT DOCUMENTS

| | | | |
|---|---|---|---|
| 5,677,450 A | 10/1997 | Suzuki et al. | |
| 6,369,299 B1 * | 4/2002 | Sadowsky | C12N 15/8259 47/58.1 R |
| 6,646,030 B2 * | 11/2003 | Heinen | C09K 21/14 252/609 |
| 7,704,724 B1 | 4/2010 | Fry et al. | |
| 7,812,077 B2 * | 10/2010 | Borade | C08K 5/0066 524/100 |
| 7,923,506 B2 * | 4/2011 | Cohoon | C08L 67/02 521/48 |
| 8,257,820 B2 * | 9/2012 | Paul | B32B 7/12 428/195.1 |
| 2002/0155571 A1 * | 10/2002 | Raillard | C12N 9/14 435/196 |
| 2003/0006197 A1 | 1/2003 | Mahoney et al. | |
| 2009/0048383 A1 * | 2/2009 | Rodak | C08K 9/04 524/445 |
| 2009/0221014 A1 | 9/2009 | Reardon et al. | |
| 2011/0269880 A1 * | 11/2011 | Pfaendner | C08K 5/134 524/140 |
| 2014/0080949 A1 * | 3/2014 | Roth | C08K 5/098 524/154 |
| 2018/0282775 A1 | 10/2018 | Raemakers-Franken et al. | |

FOREIGN PATENT DOCUMENTS

| JP | S51-127152 | 11/1976 |
| WO | WO200164912 | * 9/2001 |

OTHER PUBLICATIONS

Nguyen et al. (Molecules, vol. 20, pp. 11236-11256, 2015).*
International Search Report for PCT/EP2014/074969, dated Mar. 5, 2015, 3 pages.
Written Opinion of the ISA for PCT/EP2014/074969, dated Mar. 5, 2015, 6 pages.
Document XP002723295, Week 197651, Thomson Scientific, 1976-95407X, 2 pages.
Seffernick et al., "Bacterial Ammeline Metabolism via Guanine Deaminase", Journal of Bacteriology, vol. 192, No. 4, Dec. 18, 2009, pp. 1106-1112.
Restriction/Election of Species Requirement issued in U.S. Appl. No. 15/033,949, dated Sep. 19, 2018.
Non-Final Office Action issued in U.S. Appl. No. 15/033,949, dated Nov. 19, 2018.
Notice of Allowance issued in U.S. Appl. No. 15/033,949, dated Jul. 29, 2019.
Seffernick et al. X-ray Structure and Mutational Analysis of the Atrazine Chlorohydrolase TrzN, Journal of Biotechnology Chemistry, 285:30606-30614 (Oct. 1, 2010).

* cited by examiner

*Primary Examiner* — Hope A Robinson
(74) *Attorney, Agent, or Firm* — Nixon & Vanderhye P.C.

(57) ABSTRACT

The invention relates to a flame-retardant polyamide composition comprising a polyamide with a melting temperature higher than 265° C. and ammeline and/or ammelide, in which the ammeline and/or ammelide is obtainable by a biocatalytic process from melamine in an aqueous reaction mixture comprising a biocatalyst, wherein melamine is converted into ammeline and optionally further into ammelide.

8 Claims, No Drawings

Specification includes a Sequence Listing.

SEQUENCE LISTING

```
<160> NUMBER OF SEQ ID NOS: 14

<210> SEQ ID NO 1
<211> LENGTH: 1422
<212> TYPE: DNA
<213> ORGANISM: Artificial Sequence
<220> FEATURE:
<223> OTHER INFORMATION: Description of Artificial Sequence: Synthetic
      codon pair optimized Acidovorax citrulli NRRL
      B-12227 melamine deaminase gene for E. coli

<400> SEQUENCE: 1
atgcagactc tgtctatcca gcacggtact ctggttacca tggaccagta ccgtcgcgta      60
ctgggtgact cctgggttca cgttcaggac ggtcgtatcg ttgcgctggg tgttcacgct     120
gaatccgtac cgccgccagc tgaccgcgtt atcgacgcac gtggtaaagt tgttctgccg     180
ggcttcatca acgcacacac tcacgttaac cagatcctgc tgcgcggtgg tccgtctcac     240
ggtcgtcagc tgtacgactg gctgttcaac gttctgtacc cgggtcagaa agcgatgcgt     300
ccggaagacg ttgctgttgc tgtacgtctg tactgcgcag aagcggtacg ttctggtatc     360
accactatca acgacaacgc tgactccgct atctacccgg gtaacatcga agctgcaatg     420
gcggtttacg gtgaagttgg cgtacgcgtt gtttacgcac gtatgttctt cgaccgtatg     480
gacggtcgta ttcagggtta cgttgatgca ctgaaagcgc gttctccgca ggttgaactg     540
tgctccatca tggaagaaac tgctgttgct aaagaccgta tcactgcgct gtctgaccag     600
taccacggta ctgctggcgg tcgtatctcc gtatggccgg caccggcaat cactccggca     660
gtaactgttg aaggtatgcg ctgggcgcag gcattcgctc gcgaccgtgc ggtaatgtgg     720
actctgcaca tggctgaatc tgaccacgac gaacgtctgc actggatgtc tccggcagaa     780
tacatggagt gctacggtct gctggatgag cgtctgcagg ttgctcactg cgtttacttc     840
gaccgtaaag acgttcgtct gctgcaccgt cacaacgtta aagttgcttc tcaggttgtt     900
tctaacgctt acctgggttc tggtgttgct ccggtaccgg aaatggttga gcgtggtatg     960
gctgttggta tcggtactga cgacggtaac tgcaacgact ccgttaacat gatcggtgac    1020
```

```
atgaagttca tggcgcacat ccaccgcgct gttcaccgcg acgctgacgt tctgactccg    1080
gaaaaaatcc tggaaatggc gactatcgac ggtgcgcgtt ctctgggtat ggaccacgaa    1140
atcggttcta tcgaaaccgg taagcgcgct gacctgattc tgctggatct gcgtcacccg    1200
cagactactc cgcaccacca cctggctgca actatcgttt ccaggctta cggtaacgaa     1260 gttgataccg ttctgatcga cggtaacgtt gtaatggaaa accgtcgtct gtctttcctg    1320
ccgccagaac gtgaactggc attcctgaaa gaagcgcagt ctcgcgcaac tgctatcctg    1380
cagcgtgcta acatggttgc taacccggca tggcgttccc tt                       1422
```

```
<210> SEQ ID NO 2
<211> LENGTH: 327
<212> TYPE: DNA
<213> ORGANISM: Artificial Sequence
<220> FEATURE:
<223> OTHER INFORMATION: Description of Artificial Sequence: Synthetic
      codon pair optimized Ketogulonicigenium vulgare
      Y25 melamine deaminase gene for E. coli

<400> SEQUENCE: 2
```

```
atgcgtgaag ttctggagtt cgcaactatc aacggtgcga aggtctgcg tctggatcac      60 aaaaccggtt ctctgactcc gggtaaagaa gctgacatca tcctgctgga cgcaactgcg    120
ctgaacgttg ctccgctgaa caacgcaccg ggtgctgttg ttactctgat ggaacgttct    180
aacgttgaaa ccgtactggt tgctggtcag atcaagaagt ggcagggtgc gctgatcggt    240
caggacatcg ctgcactgcg tgaccagatc atcgcttctc gcgactacct gttcgaagct    300
gctggcgtag aagttccgct gttcgac                                        327
```

```
<210> SEQ ID NO 3
<211> LENGTH: 1431
<212> TYPE: DNA
<213> ORGANISM: Artificial Sequence
<220> FEATURE:
<223> OTHER INFORMATION: Description of Artificial Sequence: Synthetic
      codon pair optimized Gordonia rubripertincta (Rhodococcus
      corallinus NRRL B-15444R) triazine hydrolase gene for E. coli

<400> SEQUENCE: 3
```

```
atgactcgta tcgctatcac tggcggtcgc gtactgacca tggacccgga acgtcgcgtt     60
ctggaaccgg gtactgttgt tgttgaagat cagttcatcg ctcaggttgg ttctccgact    120
acttctactt ctgctgcacc gaaatcttcc actccgccag gctggcagtg ctctccggct    180
tcttccactc cgactccgac ttctcacaaa tcttcttccg gtgttgttca cccgatgact    240
gcaacttctt ctaacggttg caccacttgc tccatcccgg catctctgcc gactcagact    300
accacttctg aatctgaaca ctgctgcact gcaccgaagc cgttcgttct ggcttctccg    360
ctgtcttcca ccactcgtac ttctgacccg actacttctc cggcaccagg tccgccaggt    420
tctccgttca ctgacgcagg tatccgtgct atctacgcac gtatgtactt cgacgcaccg    480
cgcgctgaac tggaagagct ggttgcaact atccacgcga agcgccgggg tgcggtacgt    540
atggacgaat ctgcttctac tgaccacgta ctggctgacc tggatcagct gatcactcgt    600
cacgaccgta ctgctgacgg tcgtatccgc gtatggccgg caccggcaat cccgttcatg    660
gtttctgaaa aaggtatgaa agcggcacag gaaatcgctg cttcccgtac tgacggctgg    720
accatgcacg tttctgaaga tccgatcgaa gcgcgcgttc actctatgaa cgcaccggaa    780
tacctgcacc acctgggttg cctggatgac cgtctgctgg cagctcactg cgtacacatc    840
gactcccgcg atatccgtct gttccgtcag cacgacgtta agatctccac tcagccggtt    900
```

| | |
|---|---:|
| tctaactctt acctggctgc tggtatcgct ccggttccgg aaatgctggc gcacggtgtt | 960 |
| accgttggta tcggtactga cgacgctaac tgcaacgact ccgttaacct gatttctgac | 1020 |
| atgaaagttc tggcgctgat ccaccgcgct gctcaccgcg acgcttctat catcactccg | 1080 |
| gaaaaaatca tcgaaatggc gactatcgac ggtgcgcgtt gcatcggtat ggctgaccag | 1140 |
| atcggttctc tggaagcagg taagcgcgct gacatcatca ctctggatct gcgtcacgct | 1200 |
| cagactactc cggcacacga cctggcggca actatcgttt ccaggcttac ggtaacgaa | 1260 |
| gttaacgacg ttctggttaa cggttctgtt gtaatgcgtg accgcgttct gtctttcctg | 1320 |
| ccgactccgc aggaagagaa agcgctgtac gacgacgctt ctgaacgttc tgctgcgatg | 1380 |
| ctggcgcgtg ctggtctgac cggtactcgt acctggcaga ctctgggcag c | 1431 |

<210> SEQ ID NO 4
<211> LENGTH: 1395
<212> TYPE: DNA
<213> ORGANISM: Artificial Sequence
<220> FEATURE:
<223> OTHER INFORMATION: Description of Artificial Sequence: Synthetic
      codon pair optimized Bradyrhizobium japonicum
      USDA 110 guanine deaminase gene for E. coli

<400> SEQUENCE: 4

| | |
|---|---:|
| atgactaccg ttggtatccg tggtactttc ttcgacttcg ttgatgaccc gtggaaacac | 60 |
| atcggtaacg aacaggctgc tgctcgcttc caccaggacg tctgatggt tgttactgac | 120 |
| ggtgttatca aagcgttcgg tccgtacgag aagatcgctg ctgcacaccc gggcgttgaa | 180 |
| atcactcaca tcaaagaccg tatcatcgtt ccgggcttca tcgacggtca catccacctg | 240 |
| ccgcagactc gcgtactggg tgcttacggt gaacagctgc tgccgtggct gcagaaatct | 300 |
| atctacccgg aagagatcaa atacaaagac cgtaactacg cacgtgaagg tgttaagcgc | 360 |
| ttcctggatg cgctgctggc agctggtact accacttgcc aggcattcac ttcttcttct | 420 |
| ccggttgcaa ctgaagagct gttcgaagaa gcgtctcgcc gtaacatgcg cgttatcgct | 480 |
| ggtctgaccg gtatcgaccg taacgcaccg gcagaattca tcgacactcc ggaaaacttc | 540 |
| taccgtgact ccaagcgtct gatcgctcag taccacgaca aggtcgtaa cctgtacgct | 600 |
| atcactccgc gcttcgcatt cggtgcgtct ccggaactgc tgaaagcgtg ccagcgtctg | 660 |
| aaacacgaac cccgactg ctgggttaac actcacatct gaaaaccc ggcagaatgc | 720 |
| tccggcgtac tggttgaaca cccggactgc caggactacc tgggtgttta cgaaaaattc | 780 |
| gacctggttg tccgaaatt ctctggtggt cacggtgttt acctgtctaa caacgaattc | 840 |
| cgtcgtatgt ccaagaaagg cgcagctgtt gttttctgcc catgctccaa cctgttcctg | 900 |
| ggttctggtc tgttccgtct gggtcgtgcg actgacccgg aacaccgcgt taagatgtcc | 960 |
| ttcggtactg acgttggtgg tgtaaccgc ttctccatga tctccgttct ggatgacgct | 1020 |
| tacaaagttg gtatgtgtaa caacaccctg ctggatggtt ctatcgaccc gtcccgtaaa | 1080 |
| gacctggctg aagctgaacg taacaagctg tctccgtacc gtggcttctg gtctgtaact | 1140 |
| ctgggtggtc tgaaggtct gtacatcgac gacaaactgg gtaacttcga accaggtaaa | 1200 |
| gaagctgact tcgttgcgct ggatccgaac ggtggtcagc tggcgcagcc gtggcaccag | 1260 |
| tctctgatcg ctgacggtgc aggtccgcgt accgttgacg aagcagcttc tatgctgttc | 1320 |
| gctgtaatga tggttggtga cgaccgctgc gtagacgaaa cctgggtaat gggtaagcgt | 1380 |
| ctgtacaaga aatcc | 1395 |

<210> SEQ ID NO 5
<211> LENGTH: 474
<212> TYPE: PRT
<213> ORGANISM: Acidovorax citrulli
<220> FEATURE:
<223> OTHER INFORMATION: Wild type melamine deaminase sequence

<400> SEQUENCE: 5

```
Met Gln Thr Leu Ser Ile Gln His Gly Thr Leu Val Thr Met Asp Gln
1               5                   10                  15

Tyr Arg Arg Val Leu Gly Asp Ser Trp Val His Val Gln Asp Gly Arg
            20                  25                  30

Ile Val Ala Leu Gly Val His Ala Glu Ser Val Pro Pro Pro Ala Asp
        35                  40                  45

Arg Val Ile Asp Ala Arg Gly Lys Val Val Leu Pro Gly Phe Ile Asn
    50                  55                  60

Ala His Thr His Val Asn Gln Ile Leu Leu Arg Gly Gly Pro Ser His
65                  70                  75                  80

Gly Arg Gln Leu Tyr Asp Trp Leu Phe Asn Val Leu Tyr Pro Gly Gln
                85                  90                  95

Lys Ala Met Arg Pro Glu Asp Val Ala Val Ala Val Arg Leu Tyr Cys
            100                 105                 110

Ala Glu Ala Val Arg Ser Gly Ile Thr Thr Ile Asn Asp Asn Ala Asp
        115                 120                 125

Ser Ala Ile Tyr Pro Gly Asn Ile Glu Ala Ala Met Ala Val Tyr Gly
    130                 135                 140

Glu Val Gly Val Arg Val Val Tyr Ala Arg Met Phe Phe Asp Arg Met
145                 150                 155                 160

Asp Gly Arg Ile Gln Gly Tyr Val Asp Ala Leu Lys Ala Arg Ser Pro
                165                 170                 175

Gln Val Glu Leu Cys Ser Ile Met Glu Glu Thr Ala Val Ala Lys Asp
            180                 185                 190

Arg Ile Thr Ala Leu Ser Asp Gln Tyr His Gly Thr Ala Gly Gly Arg
        195                 200                 205

Ile Ser Val Trp Pro Ala Pro Ala Ile Thr Pro Ala Val Thr Val Glu
    210                 215                 220

Gly Met Arg Trp Ala Gln Ala Phe Ala Arg Asp Arg Ala Val Met Trp
225                 230                 235                 240

Thr Leu His Met Ala Glu Ser Asp His Asp Glu Arg Leu His Trp Met
                245                 250                 255

Ser Pro Ala Glu Tyr Met Glu Cys Tyr Gly Leu Leu Asp Glu Arg Leu
            260                 265                 270

Gln Val Ala His Cys Val Tyr Phe Asp Arg Lys Asp Val Arg Leu Leu
        275                 280                 285

His Arg His Asn Val Lys Val Ala Ser Gln Val Val Ser Asn Ala Tyr
    290                 295                 300

Leu Gly Ser Gly Val Ala Pro Val Pro Glu Met Val Glu Arg Gly Met
305                 310                 315                 320

Ala Val Gly Ile Gly Thr Asp Asp Gly Asn Cys Asn Asp Ser Val Asn
                325                 330                 335

Met Ile Gly Asp Met Lys Phe Met Ala His Ile His Arg Ala Val His
            340                 345                 350

Arg Asp Ala Asp Val Leu Thr Pro Glu Lys Ile Leu Glu Met Ala Thr
        355                 360                 365
```

```
Ile Asp Gly Ala Arg Ser Leu Gly Met Asp His Glu Ile Gly Ser Ile
    370                 375                 380

Glu Thr Gly Lys Arg Ala Asp Leu Ile Leu Leu Asp Leu Arg His Pro
385                 390                 395                 400

Gln Thr Thr Pro His His His Leu Ala Ala Thr Ile Val Phe Gln Ala
                405                 410                 415

Tyr Gly Asn Glu Val Asp Thr Val Leu Ile Asp Gly Asn Val Val Met
            420                 425                 430

Glu Asn Arg Arg Leu Ser Phe Leu Pro Pro Glu Arg Glu Leu Ala Phe
        435                 440                 445

Leu Glu Glu Ala Gln Ser Arg Ala Thr Ala Ile Leu Gln Arg Ala Asn
    450                 455                 460

Met Val Ala Asn Pro Ala Trp Arg Ser Leu
465                 470

<210> SEQ ID NO 6
<211> LENGTH: 109
<212> TYPE: PRT
<213> ORGANISM: Ketogulonicigenium vulgare
<220> FEATURE:
<223> OTHER INFORMATION: Wild type melamine deaminase sequence;
      Ketogulonicigenium vulgare Y25

<400> SEQUENCE: 6

Met Arg Glu Val Leu Glu Phe Ala Thr Ile Asn Gly Ala Lys Gly Leu
1               5                   10                  15

Arg Leu Asp His Lys Thr Gly Ser Leu Thr Pro Gly Lys Glu Ala Asp
            20                  25                  30

Ile Ile Leu Leu Asp Ala Thr Ala Leu Asn Val Ala Pro Leu Asn Asn
        35                  40                  45

Ala Pro Gly Ala Val Val Thr Leu Met Glu Arg Ser Asn Val Glu Thr
    50                  55                  60

Val Leu Val Ala Gly Gln Ile Lys Lys Trp Gln Gly Ala Leu Ile Gly
65                  70                  75                  80

Gln Asp Ile Ala Ala Leu Arg Asp Gln Ile Ile Ala Ser Arg Asp Tyr
                85                  90                  95

Leu Phe Glu Ala Ala Gly Val Glu Val Pro Leu Phe Asp
            100                 105

<210> SEQ ID NO 7
<211> LENGTH: 477
<212> TYPE: PRT
<213> ORGANISM: Gordonia rubripertincta
<220> FEATURE:
<223> OTHER INFORMATION: Wild type triazine hydrolase sequence;
      Rhodococcus corallinus NRRL B-15444R

<400> SEQUENCE: 7

Met Thr Arg Ile Ala Ile Thr Gly Gly Arg Val Leu Thr Met Asp Pro
1               5                   10                  15

Glu Arg Arg Val Leu Glu Pro Gly Thr Val Val Glu Asp Gln Phe
            20                  25                  30

Ile Ala Gln Val Gly Ser Pro Thr Thr Ser Thr Ser Ala Ala Pro Lys
        35                  40                  45

Ser Ser Thr Pro Pro Gly Trp Gln Cys Ser Pro Ala Ser Thr Pro
    50                  55                  60
```

```
Thr Pro Thr Ser His Lys Ser Ser Gly Val His Pro Met Thr
 65                  70                  75                  80

Ala Thr Ser Ser Asn Gly Cys Thr Thr Cys Ser Ile Pro Ala Ser Leu
                 85                  90                  95

Pro Thr Gln Thr Thr Thr Ser Glu Ser Glu His Cys Cys Thr Ala Pro
            100                 105                 110

Lys Pro Phe Val Leu Ala Ser Pro Leu Ser Ser Thr Thr Arg Thr Ser
        115                 120                 125

Asp Pro Thr Thr Ser Pro Ala Pro Gly Pro Pro Gly Ser Pro Phe Thr
        130                 135                 140

Asp Ala Gly Ile Arg Ala Ile Tyr Ala Arg Met Tyr Phe Asp Ala Pro
145                 150                 155                 160

Arg Ala Glu Leu Glu Glu Leu Val Ala Thr Ile His Ala Lys Ala Pro
                165                 170                 175

Gly Ala Val Arg Met Asp Glu Ser Ala Ser Thr Asp His Val Leu Ala
                180                 185                 190

Asp Leu Asp Gln Leu Ile Thr Arg His Asp Arg Thr Ala Asp Gly Arg
                195                 200                 205

Ile Arg Val Trp Pro Ala Pro Ala Ile Pro Phe Met Val Ser Glu Lys
210                 215                 220

Gly Met Lys Ala Ala Gln Glu Ile Ala Ala Ser Arg Thr Asp Gly Trp
225                 230                 235                 240

Thr Met His Val Ser Glu Asp Pro Ile Glu Ala Arg Val His Ser Met
                245                 250                 255

Asn Ala Pro Glu Tyr Leu His His Leu Gly Cys Leu Asp Asp Arg Leu
                260                 265                 270

Leu Ala Ala His Cys Val His Ile Asp Ser Arg Asp Ile Arg Leu Phe
                275                 280                 285

Arg Gln His Asp Val Lys Ile Ser Thr Gln Pro Val Ser Asn Ser Tyr
                290                 295                 300

Leu Ala Ala Gly Ile Ala Pro Val Pro Glu Met Leu Ala His Gly Val
305                 310                 315                 320

Thr Val Gly Ile Gly Thr Asp Asp Ala Asn Cys Asn Asp Ser Val Asn
                325                 330                 335

Leu Ile Ser Asp Met Lys Val Leu Ala Leu Ile His Arg Ala Ala His
                340                 345                 350

Arg Asp Ala Ser Ile Ile Thr Pro Glu Lys Ile Ile Glu Met Ala Thr
                355                 360                 365

Ile Asp Gly Ala Arg Cys Ile Gly Met Ala Asp Gln Ile Gly Ser Leu
                370                 375                 380

Glu Ala Gly Lys Arg Ala Asp Ile Ile Thr Leu Asp Leu Arg His Ala
385                 390                 395                 400

Gln Thr Thr Pro Ala His Asp Leu Ala Ala Thr Ile Val Phe Gln Ala
                405                 410                 415

Tyr Gly Asn Glu Val Asn Asp Val Leu Val Asn Gly Ser Val Val Met
                420                 425                 430

Arg Asp Arg Val Leu Ser Phe Leu Pro Thr Pro Gln Glu Lys Ala
                435                 440                 445

Leu Tyr Asp Asp Ala Ser Glu Arg Ser Ala Ala Met Leu Ala Arg Ala
                450                 455                 460

Gly Leu Thr Gly Thr Arg Thr Trp Gln Thr Leu Gly Ser
465                 470                 475
```

<210> SEQ ID NO 8
<211> LENGTH: 465
<212> TYPE: PRT
<213> ORGANISM: Bradyrhizobium japonicum
<220> FEATURE:
<223> OTHER INFORMATION: Wild type guanine deaminase sequence

<400> SEQUENCE: 8

```
Met Thr Thr Val Gly Ile Arg Gly Thr Phe Phe Asp Phe Val Asp Asp
1               5                   10                  15

Pro Trp Lys His Ile Gly Asn Glu Gln Ala Ala Ala Arg Phe His Gln
            20                  25                  30

Asp Gly Leu Met Val Val Thr Asp Gly Val Ile Lys Ala Phe Gly Pro
        35                  40                  45

Tyr Glu Lys Ile Ala Ala Ala His Pro Gly Val Glu Ile Thr His Ile
50                  55                  60

Lys Asp Arg Ile Ile Val Pro Gly Phe Ile Asp Gly His Ile His Leu
65                  70                  75                  80

Pro Gln Thr Arg Val Leu Gly Ala Tyr Gly Glu Gln Leu Leu Pro Trp
                85                  90                  95

Leu Gln Lys Ser Ile Tyr Pro Glu Glu Ile Lys Tyr Lys Asp Arg Asn
            100                 105                 110

Tyr Ala Arg Glu Gly Val Lys Arg Phe Leu Asp Ala Leu Leu Ala Ala
        115                 120                 125

Gly Thr Thr Cys Gln Ala Phe Thr Ser Ser Pro Val Ala Thr
130                 135                 140

Glu Glu Leu Phe Glu Glu Ala Ser Arg Arg Asn Met Arg Val Ile Ala
145                 150                 155                 160

Gly Leu Thr Gly Ile Asp Arg Asn Ala Pro Ala Glu Phe Ile Asp Thr
                165                 170                 175

Pro Glu Asn Phe Tyr Arg Asp Ser Lys Arg Leu Ile Ala Gln Tyr His
            180                 185                 190

Asp Lys Gly Arg Asn Leu Tyr Ala Ile Thr Pro Arg Phe Ala Phe Gly
        195                 200                 205

Ala Ser Pro Glu Leu Leu Lys Ala Cys Gln Arg Leu Lys His Glu His
210                 215                 220

Pro Asp Cys Trp Val Asn Thr His Ile Ser Glu Asn Pro Ala Glu Cys
225                 230                 235                 240

Ser Gly Val Leu Val Glu His Pro Asp Cys Gln Asp Tyr Leu Gly Val
                245                 250                 255

Tyr Glu Lys Phe Asp Leu Val Gly Pro Lys Phe Ser Gly His Gly
            260                 265                 270

Val Tyr Leu Ser Asn Asn Glu Phe Arg Arg Met Ser Lys Lys Gly Ala
        275                 280                 285

Ala Val Val Phe Cys Pro Cys Ser Asn Leu Phe Leu Gly Ser Gly Leu
290                 295                 300

Phe Arg Leu Gly Arg Ala Thr Asp Pro Glu His Arg Val Lys Met Ser
305                 310                 315                 320

Phe Gly Thr Asp Val Gly Gly Gly Asn Arg Phe Ser Met Ile Ser Val
                325                 330                 335

Leu Asp Asp Ala Tyr Lys Val Gly Met Cys Asn Asn Thr Leu Leu Asp
            340                 345                 350

Gly Ser Ile Asp Pro Ser Arg Lys Asp Leu Ala Glu Ala Glu Arg Asn
        355                 360                 365
```

```
Lys Leu Ser Pro Tyr Arg Gly Phe Trp Ser Val Thr Leu Gly Gly Ala
    370                 375                 380

Glu Gly Leu Tyr Ile Asp Asp Lys Leu Gly Asn Phe Glu Pro Gly Lys
385                 390                 395                 400

Glu Ala Asp Phe Val Ala Leu Asp Pro Asn Gly Gly Gln Leu Ala Gln
                405                 410                 415

Pro Trp His Gln Ser Leu Ile Ala Asp Gly Ala Gly Pro Arg Thr Val
            420                 425                 430

Asp Glu Ala Ala Ser Met Leu Phe Ala Val Met Met Val Gly Asp Asp
                435                 440                 445

Arg Cys Val Asp Glu Thr Trp Val Met Gly Lys Arg Leu Tyr Lys Lys
    450                 455                 460

Ser
465

<210> SEQ ID NO 9
<211> LENGTH: 439
<212> TYPE: PRT
<213> ORGANISM: Escherichia coli
<220> FEATURE:
<223> OTHER INFORMATION: Wild type Escherichia coli guanine deaminase
      sequence

<400> SEQUENCE: 9

Met Met Ser Gly Glu His Thr Leu Lys Ala Val Arg Gly Ser Phe Ile
1               5                   10                  15

Asp Val Thr Arg Thr Ile Asp Asn Pro Glu Glu Ile Ala Ser Ala Leu
                20                  25                  30

Arg Phe Ile Glu Asp Gly Leu Leu Ile Lys Gln Gly Lys Val Glu
            35                  40                  45

Trp Phe Gly Glu Trp Glu Asn Gly Lys His Gln Ile Pro Asp Thr Ile
    50                  55                  60

Arg Val Arg Asp Tyr Arg Gly Lys Leu Ile Val Pro Gly Phe Val Asp
65                  70                  75                  80

Thr His Ile His Tyr Pro Gln Ser Glu Met Val Gly Ala Tyr Gly Glu
                85                  90                  95

Gln Leu Leu Glu Trp Leu Asn Lys His Thr Phe Pro Thr Glu Arg Arg
            100                 105                 110

Tyr Glu Asp Leu Glu Tyr Ala Arg Glu Met Ser Ala Phe Phe Ile Lys
        115                 120                 125

Gln Leu Leu Arg Asn Gly Thr Thr Thr Ala Leu Val Phe Gly Thr Val
    130                 135                 140

His Pro Gln Ser Val Asp Ala Leu Phe Glu Ala Ala Ser His Ile Asn
145                 150                 155                 160

Met Arg Met Ile Ala Gly Lys Val Met Met Asp Arg Asn Ala Pro Asp
                165                 170                 175

Tyr Leu Leu Asp Thr Ala Glu Ser Ser Tyr His Gln Ser Lys Glu Leu
            180                 185                 190

Ile Glu Arg Trp His Lys Asn Gly Arg Leu Leu Tyr Ala Ile Thr Pro
        195                 200                 205

Arg Phe Ala Pro Thr Ser Ser Pro Glu Gln Met Ala Met Ala Gln Arg
    210                 215                 220

Leu Lys Glu Glu Tyr Pro Asp Thr Trp Val His Thr His Leu Cys Glu
225                 230                 235                 240

Asn Lys Asp Glu Ile Ala Trp Val Lys Ser Leu Tyr Pro Asp His Asp
                245                 250                 255
```

```
Gly Tyr Leu Asp Val Tyr His Gln Tyr Gly Leu Thr Gly Lys Asn Cys
            260                 265                 270

Val Phe Ala His Cys Val His Leu Glu Glu Lys Glu Trp Asp Arg Leu
            275                 280                 285

Ser Glu Thr Lys Ser Ser Ile Ala Phe Cys Pro Thr Ser Asn Leu Tyr
            290                 295                 300

Leu Gly Ser Gly Leu Phe Asn Leu Lys Lys Ala Trp Gln Lys Lys Val
305                 310                 315                 320

Lys Val Gly Met Gly Thr Asp Ile Gly Ala Gly Thr Thr Phe Asn Met
                    325                 330                 335

Leu Gln Thr Leu Asn Glu Ala Tyr Lys Val Leu Gln Leu Gln Gly Tyr
            340                 345                 350

Arg Leu Ser Ala Tyr Glu Ala Phe Tyr Leu Ala Thr Leu Gly Gly Ala
            355                 360                 365

Lys Ser Leu Gly Leu Asp Asp Leu Ile Gly Asn Phe Leu Pro Gly Lys
    370                 375                 380

Glu Ala Asp Phe Val Val Met Glu Pro Thr Ala Thr Pro Leu Gln Gln
385                 390                 395                 400

Leu Arg Tyr Asp Asn Ser Val Ser Leu Val Asp Lys Leu Phe Val Met
                405                 410                 415

Met Thr Leu Gly Asp Asp Arg Ser Ile Tyr Arg Thr Tyr Val Asp Gly
            420                 425                 430

Arg Leu Val Tyr Glu Arg Asn
        435

<210> SEQ ID NO 10
<211> LENGTH: 1425
<212> TYPE: DNA
<213> ORGANISM: Acidovorax citrulli
<220> FEATURE:
<223> OTHER INFORMATION: Wild type melamine deaminase sequence (triA)

<400> SEQUENCE: 10
atgcaaacgc tcagcatcca gcacggtacc ctcgtcacga tggatcagta ccgcagagtc      60
cttggggata gctgggttca cgtgcaggat ggacggatcg tcgcgctcgg agtgcacgcc     120
gagtcggtgc ctccgccagc ggatcgggtg atcgatgcac gcggcaaggt cgtgttaccc     180
ggtttcatca atgcccacac ccatgtgaac cagatcctcc tgcgcggagg cccctcgcac     240
gggcgtcaac tctatgactg ctgttcaac gttttgtatc cgggacaaaa ggcgatgaga     300
ccggaggacg tagcggtggc ggtgaggttg tattgtgcgg aagctgtgcg cagcgggatt     360
acgacgatca acgacaacgc cgattcggcc atctacccag gcaacatcga ggccgcgatg     420
gcggtctatg gtgaggtggg tgtgagggtc gtctacgccc gcatgttctt tgatcggatg     480
gacgggcgca ttcaagggta tgtggacgcc ttgaaggctc gctctcccca gtcgaactg     540
tgctcgatca tggaggaaac ggctgtggcc aaagatcgga tcacagccct gtcagatcag     600
tatcatggca cggcaggagg tcgtatatca gtttggcccg ctcctgccat accccggcg     660
gtgacagttg aaggaatgcg atgggcacaa gccttcgccc gtgatcgggc ggtaatgtgg     720
acgcttcaca tggcggagag cgatcatgat gagcggcttc attggatgag tcccgccgag     780
tacatggagt gttacggact cttggatgag cgtctgcagg tcgcgcattg cgtgtacttt     840
gaccggaagg atgttcggct gctgcaccgc acaatgtga aggtcgcgtc gcaggttgtg     900
agcaatgcct acctcggctc agggggtgcc ccgtgccag agatggtgga gcgcggcatg     960
gccgtgggca ttggaacaga tgacgggaat tgtaatgact ccgtaaacat gatcggagac    1020
```

```
atgaagttta tggcccatat tcaccgcgcg gtgcatcggg atgcggacgt gctgacccca    1080
gagaagattc ttgaaatggc gacgatcgat ggggcgcgtt cgttgggaat ggaccacgag    1140
attggttcca tcgaaaccgg caagcgcgcg gaccttatcc tgcttgacct gcgtcaccct    1200
cagacgactc ctcaccatca tttggcggcc acgatcgtgt ttcaggctta cggcaatgag    1260
gtggacactg tcctgattga cggaaacgtt gtgatggaga accgccgctt gagctttctt    1320 cccccctgaac gtgagttggc gttccttgag gaagcgcaga gccgcgccac agctattttg    1380
cagcgggcga acatggtggc taacccagct tggcgcagcc tctag                    1425

<210> SEQ ID NO 11
<211> LENGTH: 330
<212> TYPE: DNA
<213> ORGANISM: Ketogulonicigenium vulgare
<220> FEATURE:
<223> OTHER INFORMATION: Wild type melamine deaminase sequence;
      Ketogulonicigenium vulgare Y25

<400> SEQUENCE: 11
gtgcgcgaag tgctggaatt tgcgacgatc aatggcgcga aaggcctgcg tctggatcac      60
aaaaccggct cgctgacccc cggcaaagag gcggatatca tcctgctgga cgccaccgcc     120
ttgaacgtcg caccgctgaa caacgccccc ggcgccgtcg tgacgctgat ggagcgttcg     180
aacgtggaaa ccgtgctggt cgccggccag atcaagaaat ggcaaggcgc attgatcggt     240
caggatatcg cggcgctgcg cgatcagatc atcgcttcgc gcgattacct gttcgaggca     300
gcgggcgtag aggtgccgct gttcgactaa                                      330

<210> SEQ ID NO 12
<211> LENGTH: 1431
<212> TYPE: DNA
<213> ORGANISM: Gordonia rubripertincta
<220> FEATURE:
<223> OTHER INFORMATION: Wild type triazine hydrolase sequence;
      Rhodococcus corallines NRRL B-15444R

<400> SEQUENCE: 12
atgaccagaa tcgcaatcac cggcggacga gtcctgacca tggaccccga gcgccgcgtg      60
ctcgaaccag gaacggttgt ggtcgaggac cagttcatcg cacaagtggg atccccgacg     120
acgtcgacat ccgcggcgcc gaaatcatcg acgccaccgg gatggcagtg ctccccggct     180
tcgtcaacac ccacacccac gtcccacaaa tcctcctcag gggtggtgca tcccatgacc     240
gcaacctcct cgaatggctg cacaacgtgc tctatcccgg cctcgctgcc tacacagacg     300
acgacatccg agtcggaaca ctgctgtact cgccgaagc ccttcgttct ggcatcacca     360
ctgtcgtcga caacgaggac gtccgaccca cgacttcgc ccgcgccggg gccgccggga     420
tcgcccttca ccgacgcagg aatccgagcc atttacgcgc gcatgtactt cgacgcgcca     480
cgcgccgaac tcgaagaact cgtcgccacc atccacgcca ggcccccgg cgccgtgcgc     540 atggacgaat cagccagcac cgaccacgta ctggcagacc tagaccaact catcacccgc     600
cacgaccgca cagcagatgg ccgcatcagg gtgtggcccg caccgccat ccccttcatg     660 gtcagtgaaa aaggaatgaa ggcagcgcaa gagatcgcag cgagccgcac cgacggctgg     720
accatgcacg tcagcgagga tcccatcgag gcccgagtgc actccatgaa cgccccggaa     780
tatttacacc acctcggctg cctcgacgac cgactccttg ccgcgcactg cgtgcatatc     840
gacagccgag acatccgcct gttccgccag cacgacgtaa aaatttctac ccaaccagta     900
tcgaacagct acctggcggc cggaattgca ccggtcccg aaatgctcgc ccacggcgtg     960
```

```
accgtgggca tcggtaccga cgacgccaac tgcaacgaca gcgtgaacct catctcggac    1020
atgaaagtgc tagcgctcat tcaccgagct gcacatcgag atgcctcaat catcacacct    1080
gaaaaaatca tcgaaatggc caccatcgac ggagcccgct gcatcggtat ggccgatcag    1140
attggttccc tcgaggcggg taaacgcgcc gacatcatca ccctcgacct tcgtcacgcc    1200
caaacaaccc cagcgcacga cttggcggcc accatcgtct ttcaggccta cggcaacgag    1260
gtcaacgacg tcctcgtcaa tggctcggta gtgatgcgcg atcgagtact ttcttttctg    1320
ccgactcccc aagaagaaaa agcgctctac gacgatgcgt cggagcgatc ggctgcaatg    1380
ctcgcacggg ccggcctcac cggcacacgc acatggcaaa cactgggatc g            1431
```

<210> SEQ ID NO 13
<211> LENGTH: 1398
<212> TYPE: DNA
<213> ORGANISM: Bradyrhizobium japonicum
<220> FEATURE:
<223> OTHER INFORMATION: Wild type guanine deaminase sequence

<400> SEQUENCE: 13

```
atgaccaccg tcggtattcg cggcacgttc ttcgatttcg tcgacgatcc ctggaagcac      60
atcggcaacg agcaggcggc tgcgcgcttt catcaggacg gcctcatggt cgtcaccgac     120
ggcgtcatca aggcgttcgg tccgtacgag aagatcgccg ccgcgcatcc gggcgttgag     180
atcacccata tcaaggaccg catcatcgtc ccgggcttca tcgacggcca catccatctg     240
cctcagaccc gcgtgctcgg tgcctatggc gagcagctct tgccgtggct gcagaagtcg     300
atctatcccg aggagatcaa gtacaaggat cgcaactacg cgcgcgaagg cgtgaagcgt     360
tttctcgatg cactgctcgc cgccggcacc accacctgcc aggccttcac cagctcctca     420
ccggtcgcga ccgaagagct gttcgaggag caagcaggc gcaacatgcg cgtgatcgcg     480
ggtctcaccg ggatcgaccg caacgcgccg gccgaattca tcgatacgcc cgagaatttc     540
tatcgcgaca gcaagcggct gatcgcgcag tatcacgaca agggccgtaa cctctacgct     600
atcacgccgc gcttcgcctt cggcgcctcg cccgagctgc tgaaggcgtg tcagcgcctc     660
aagcacgagc atccggactg ctgggtcaat ccccacatct ccgagaaccc ggccgaatgc     720
agcggcgtgc tggtcgagca cccggactgc caggattatc tcggcgtcta cgagaagttc     780
gacctggtcg gcccaaagtt ctccggcggc acggcgtct atctctcgaa caacgaattc     840
cgccgcatgt ccaagaaagg cgcggcggta gtgttctgcc cgtgctcgaa cctgttcctc     900
ggcagcggcc tgttccgtct cggccgcgcc accgatccgg agcatcgcgt gaagatgtcg     960
ttcggcaccg atgtcggcgg cggcaaccgc ttctcgatga tctccgtgct cgacgacgct    1020
tacaaggtcg gcatgtgcaa caacacgctg ctcgacggca gcatcgatcc gtcgcgcaag    1080
gacctcgcgg aagccgagcg caacaagctc tcgccctatc gtggcttctg gtcggtcacg    1140
ctcggcggcg ccgaaggcct ctacatcgac gacaagctcg gcaatttcga gcccggcaag    1200
gaggccgatt tcgtcgcgct cgatccgaac ggcggacaac tggcgcaacc ctggcaccag    1260
tcgctgattg ccgacggtgc aggtccgcgc acggttgatg aggccgcgag catgctgttc    1320
gccgtcatga tggtcggcga cgatcgctgc gtcgacgaga cctgggtgat gggcaagcgc    1380
ctctacaaga agagctga                                                  1398
```

<210> SEQ ID NO 14
<211> LENGTH: 1317
<212> TYPE: DNA
<213> ORGANISM: Escherichia coli -continued
<220> FEATURE:
<223> OTHER INFORMATION: Wild type Escherichia coli guanine deaminase
      sequence

<400> SEQUENCE: 14

```
atgatgtcag gagaacacac gttaaaagcg gtacgaggca gttttattga tgtcacccgt      60
acgatcgata acccggaaga gattgcctct gcgctgcggt ttattgagga tggtttatta     120
ctcattaaac agggaaaagt ggaatggttt ggcgaatggg aaaacggaaa gcatcaaatt     180
cctgacacca ttcgcgtgcg cgactatcgc ggcaaactga tagtaccggg ctttgtcgat     240
acacatatcc attatccgca aagtgaaatg gtgggggcct atggtgagca attgctggag     300
tggttgaata acacaccctt ccctactgaa cgtcgttatg aggatttaga gtacgcccgc     360
gaaatgtcgg cgttcttcat caagcagctt ttacgtaacg gaaccaccac ggcgctggtg     420
tttggcactg ttcatccgca atctgttgat gcgctgtttg aagccgccag tcatatcaat     480
atgcgtatga ttgccggtaa ggtgatgatg gaccgcaacg caccggatta tctgctcgac     540
actgccgaaa gcagctatca ccaaagcaaa gaactgatcg aacgctggca caaaaatggt     600
cgtctgctat atgcgattac gccacgcttc gccccgacct catctcctga acagatggcg     660
atggcgcaac gcctgaaaga agaatatccg gatacgtggg tacatacccca tctctgtgaa     720 aacaaagatg aaattgcctg ggtgaaatcg ctttatcctg accatgatgg ttatctggat     780
gtttaccatc agtacggcct gaccggtaaa aactgtgtct ttgctcactg cgtccatctc     840
gaagaaaaag agtgggatcg tctcagcgaa accaaatcca gcattgcttt ctgtccgacc     900
tccaaccttt acctcggcag cggcttattc aacttgaaaa aagcatggca gaagaaagtt     960
aaagtgggca tgggaacgga tatcggtgcc ggaaccactt tcaacatgct gcaaacgctg    1020
aacgaagcct acaaagtatt gcaattacaa ggctatcgcc tctcggctta tgaagcgttt    1080
tacctggcca cgctcggcgg agcgaaatct ctgggccttg acgatttgat tggcaacttt    1140
ttacctggca aagaggctga tttcgtggtg atggaaccca ccgccactcc gctacagcag    1200
ctgcgctatg acaactctgt ttctttagtc gacaaattgt tcgtgatgat gacgttgggc    1260
gatgaccgtt cgatctaccg cacctacgtt gatggtcgtc tggtgtacga acgcaac      1317
```

FLAME-RETARDANT POLYAMIDE COMPOSITION

This application is the U.S. national phase of International Application No. PCT/EP2014/074969 filed 19 Nov. 2014, which designated the U.S. and claims priority to EP Patent Application No. 13193877.1 filed 21 Nov. 2013, the entire contents of each of which are hereby incorporated by reference.

This invention relates to a flame-retardant polyamide composition comprising ammeline and or ammelide as flame retardant.

Ammeline (4,6-diamino-2-hydroxy-1,3,5-triazine) and ammelide (6-amino-2,4-dihydroxy-1,3,5-triazine) are 1,3,5-triazine compounds of industrial interest, e.g. for use in flame retardant compositions. They are however not commercially available on large, industrial scale today.

Flame-retardant polyamide compositions comprising ammeline and/or ammelide as flame retardant are known and are for example described in JP51-127152 and JP55-94953. In JP51-127152 polyamide compositions are disclosed with various amounts of ammeline and compared to melamine as flame retardant. A synthetical production route for ammeline was disclosed in JP51-127152, such as the high temperature pressurized decomposition of urea. It was observed that in the compositions with ammeline less mold deposit was observed, compared to melamine.

In JP55-94953, which refers to JP51-127152, it is acknowledged that ammeline is favored over melamine as there is no mold deposit observed. However, it is also described that synthetic ammeline exhibits blooming which occurs when moldings are left under high temperature and high humidity conditions. JP55-94953 solves this problem for lower melting polyamides by employing a reaction product of ammeline and ammelide as flame retardant.

Ammeline is available from several synthetic routes which have been described for both the preparation of ammeline and ammelide (E. M. Smolin and L. Rapoport. 2008. Ammelide, Ammeline and Related Compounds. In: Chemistry of heterocyclic compounds: s-Triazines and Derivatives. Volume 13. Chapter 5. p. 269-308). Such routes are quite laborious and troublesome. Furthermore, these routes require relatively expensive starting materials (e.g. dicyandiamide and biuret), severe reaction conditions (temperatures above 200° C.), halogen-containing compounds, toxic solvents (e.g. phenols, cresols or xylenol), and the addition of alcohols (e.g. methanol) for the precipitation and recovery of the ammeline and/or ammelide from the solvent. Additionally, these routes often lead to formation of ammeline and ammelide in uncontrolled ratios and to limited yields in combination with formation of varying quantities of by-products, e.g. cyanuric acid, of which removal by washing is difficult and expensive due its very low solubility. Another drawback is that for example melamine is formed as by-product.

A drawback of the flame-retardant polyamide composition comprising ammeline made by synthetic routes is that still foaming is observed when these compositions are processed at higher temperatures. This phenomenon is especially observed for glass-filled flame-retardant polyamide composition comprising polyamides having a melting temperature higher than 265° C., which during compounding in a double screw extruder can reach melt temperatures of for example at least 300° C.

It is thus an object of the present invention to provide flame-retardant polyamide composition comprising a polyamide with a melting temperature higher than 265° C. and ammeline which can be easily processed, thus in which less foaming is observed during processing.

This has surprisingly been achieved by a flame-retardant polyamide composition comprising
 a polyamide with a melting temperature higher than 265° C. and
 ammeline and/or ammelide, in which the ammeline and/or ammelide is obtainable by a biocatalytic process from melamine in an aqueous reaction mixture comprising a biocatalyst, wherein
  melamine is converted into ammeline and optionally further into ammelide.

Flame-retardant polyamide compositions according to the invention exhibit good flame retardance while being able to withstand the required molding temperatures. The flame-retardant polyamide compositions exhibit less foaming upon processing when compared to compositions comprising synthetically prepared ammeline. This is exemplified by the examples. With synthetical preparation is herein understood conventional chemical or non-enzymetical preparation.

An additional advantage of the flame-retardant polyamide composition according to the invention is that the flame retardant is halogen-free, and that also no halogen containing compounds have to be used for the production of ammeline. Presence of halogens is unwanted because of environmental concerns.

Another advantage is that the flame-retardant polyamide composition according to the invention also does not show high amounts of impurities such as dicyanediamide and cyanuric acid. These impurities are often observed for synthetic prepared ammeline and have the disadvantage that they decompose into volatile components during high temperature melt processing, or give discoloration, or reduce the effectiveness in flame retardancy. Preferably, the composition according to the invention comprises less than 0.5 wt % cyanuric acid, more preferably less than 0.3 wt % cyanuric acid and even more preferred less than 0.1 wt % cyanuric acid wherein the amount is relative to the total weight of ammeline and ammelide. It is noted that with the expression "the composition according to the invention comprises less than 0.5 wt % cyanuric acid" is herein understood that the composition may eventually comprise no cyanuaric acid at all. In other words, the composition comprises from 0 wt. % up to less than 0.5 wt % cyanuaric acid, wherein the wt. % of cyanuric acid is relative to the total weight of ammeline and ammelide.

A preferred embodiment is a flame-retardant composition comprising at most 5 wt % melamine, more preferably at most 3 wt % and most preferred at most 2 wt %, wherein the amount is relative to the total weight of ammeline and ammelide.

Polyamides with a melting temperature higher than 265° C. include for example polyamide 4.6, and semi-crystalline semi-aromatic polyamides, as well as mixtures and copolyamides. These polyamides suitably are polyphthalamides (PPAs), which are semi-crystalline semi-aromatic polyamides such as PA-XT, in which X is a diamine with 5, 6, 7, 8, 9, or 10 carbon atoms, and T is terephthalic acid, such as polyamide 4.T, polyamide 6.T, as well as copolyamides thereof, such as PA 6.T/10.T and copolyamides based on aliphatic and aromatic dicarboxylic acids. Examples thereof are polyamide 6/6.T, 6.6/6.T, 6.6/6/6.T, 6.6/6.I/6.T, and PA 6.T/6.6. Polyamides made from diamine and dicarboxylic acid are also known as AA-BB polyamides. The nomenclature is adhered to as used in Nylon Plastics Handbook, Edited by Melvin I. Kohan, Hanser Publishers, 1995; e.g. PA-6T denotes a homopolymer with building blocks 1,6- hexanediamine and terephthalic acid, PA-66/6T denotes a copolymer made from 1,6-hexanediamine, adipic acid and terephthalic acid and a blend of PA-66 and PA-6T is described as PA-66/PA-6T.

The maximum melting temperature of the polyamides is determined by the nature of the polyamide, and can be for example as high as 350° C., more preferably at most 340° C.

With the melting temperature is herein understood the temperature, measured by the DSC method according to ISO-11357-1/3, 2011, on pre-dried samples in a N2 atmosphere with heating and cooling rate of 10° C./min. Herein Tm has been calculated from the peak value of the highest melting peak in the second heating cycle.

Amount of Ammeline and/or Ammelide as Flame Retardant in the Composition:

The concentration of ammeline and/or ammeline may vary within a wide range, and is for example between 2 and 35 wt. %, preferably between 3 and 30 wt. %, most preferably between 4 and 25 wt. %, the amounts being relative to the total weight of the composition. Weight percentages are relative to the composition's total weight. If more stringent flame retardant properties are required, higher amounts have to be present, such as for example between 20 and 35 wt %. The presence of other ingredients may also affect the flame retardant properties.

Besides ammeline and/or ammelide, also other flame retardants may be present in the composition according to the invention. However, the amount of melamine is preferably at most 3 wt. %, more preferable at most 2 wt. %, even more preferable at most 1 wt. %, with respect to the total amount of ammeline and ammelide. It has been found by the inventors that melamine can be converted in a high conversion rate into ammeline and optionally further into ammelide with a limited amount of residual melamine by such a biocatalytic process wherein the biocatalyst comprises at least one enzyme belonging to the amidohydrolase superfamily and having aminohydrolase activity towards 1,3,5-triazine compounds;

Very good results are obtained with the inventive composition comprising and/or ammelide obtained by the biocatalytic process wherein the enzyme comprises an amino acid sequence represented by SEQ ID NO: 5, SEQ ID NO: 6, SEQ ID NO: 7, SEQ ID NO: 8, SEQ ID NO: 9, or a homologue thereof having a sequence identity of at least 30% with its reference.

Other suitable flame-retardants are for example phosphorus compounds, such as organic phosphates, phosphites, phosphonates and phosphinates. Preferably use is made of phosphinates. Examples of such compounds are described in for example Kirk Othmer, Encyclopedia of chemical technology, Vol. 10, p. 396 ff. (1980).

Preferably, a dialkylphosphinic salt of the formula (I) and/or of a diphosphinic salt of the formula (II) and/or polymers thereof is present in the composition according to the invention;

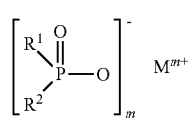

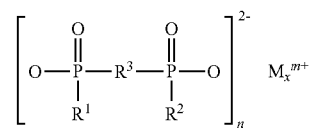

in which
R1, R2 are the same or different and are each linear or branched C1-C6-alkyl;
R3 is linear or branched C1-C10-alkylene, C6-C10-arylene, C7-C20-alkylarylene or C7-C20-arylalkylene;
M is Mg, Ca, Al, Sb, Sn, Ge, Ti, Zn, Fe, Zr, Ce, Bi, Sr, Mn, Li, Na, K and/or a protonated nitrogen base;
m is 1 to 4;
n is 1 to 4;
x is 1 to 4.

Optionally, if a dialkylphosphinic salt of the formula (I) and/or of a diphosphinic salt of the formula (II) and/or polymers thereof is present, the composition according to the invention may also comprise a salt of phosphorous acid having the formula (III)

$$[HP(=O)O_2]^{2-}M^{m+} \qquad (III)$$

in which
M is Mg, Ca, Al, Sb, Sn, Ge, Ti, Zn, Fe, Zr, Ce, Bi, Sr, Mn, Li, Na and/or K;
m is 1 to 4.

Flame-retardants according to the formula's (I) to (III) above are described in US2013190432.

It is particularly advantageous to use an organic phosphorus compound with a phosphorus content of at least 14 wt. %; preferably 18 wt. %. Examples thereof are Amgard P45, and the pure or mixed metal phosphinates (trade name Exolit OP1230 or OP1400 by Clariant) as for instance in U.S. Pat. Nos. 4,208,321 and 3,594,347.

The concentration of organic phosphorus compound which may be optionally present, may vary within a wide range, for example between 0.5 and 20 wt. %, preferably between 1 and 12 wt. %, even more preferably between 2 and 10 wt. %.

Most preferred is a flame-retardant composition which comprises between 4 to 25 wt % ammeline and/or ammelide and 2 to 10 wt % of an organic phosphorus compound.

Other Ingredients of the Composition:

The polyamide composition of the present invention may optionally comprise further components, such as inorganic fillers, fibrous reinforcing agents, other polymers, as well as additives selected from, for example, acid scavengers, impact modifiers, plasticizers, stabilizers (such as, for example, thermal stabilizers, oxidative stabilizers, UV light stabilizers and chemical stabilizers), processing aids (such as, for example, mold release agents and nucleating agents), solid lubricants, colorants (such as carbon black, other pigments, dyes), nanoclays, etc.

The flame-retardant composition according to the invention is particularly suitable when glass fibers are present as filler, as glass-filled compositions usually require higher processing temperatures. The flame-retardant composition may optionally comprise at least 5 wt % glass fibers, preferably at least 10 wt % glass fibers. The amount of glass fibers may be as high as 60 wt %, preferably at most 50 wt %, relative to the total weight of the composition.

Other suitable fillers include minerals such as talcum, mica, wollastonite or blends between such fillers and glass fibers.

Process for Preparation of Ammeline and/or Ammelide

Ammeline and/or ammelide is obtainable by a biocatalytic process from melamine in an aqueous reaction mixture comprising a biocatalyst, wherein melamine is converted into ammeline and optionally further into ammelide.

Preferably, the biocatalyst comprises at least one enzyme belonging to the amidohydrolase superfamily and having aminohydrolase activity towards 1,3,5-triazine compounds. In a preferred embodiment thereof, the enzyme comprises an amino acid sequence represented by SEQ ID NO: 5, SEQ ID NO: 6, SEQ ID NO: 7, SEQ ID NO: 8, SEQ ID NO: 9, or a homologue thereof having a sequence identity of at least 30% with its reference.

"Biocatalyst" as defined herein is a biological material or moiety derived from a biological source which catalyzes the reaction step(s) in the process according to the invention. The biocatalyst may be in principle any organism, e.g. a microorganism, or a biomolecule derived there from. It may in particular comprise one or more enzymes.

The "amidohydrolase superfamily" is a structure-based cluster of "metal-dependent hydrolase" enzymes which contain a triosephosphate isomerase (TIM)-like barrel fold in the catalytic domain. Members of this superfamily catalyze the cleavage of not only C—N but also C—C, C—O, C—Cl, C—S and O—P bonds of organic compounds (L. Aimin, L. Tingfeng, F. Rong. 2007. Amidohydrolase superfamily. In: Encyclopedia of life sciences 2007).

An "enzyme having aminohydrolase activity towards 1,3,5-triazine compounds" is an enzyme having hydrolytic activity towards amino-substituted 1,3,5-triazine compounds with the ability to convert one or more amino substituents to hydroxy substituents by hydrolysis of the C—N bond between a carbon atom in the triazine ring and the N-atom of the amino substituent, meanwhile generating ammonia (reaction scheme [1]).

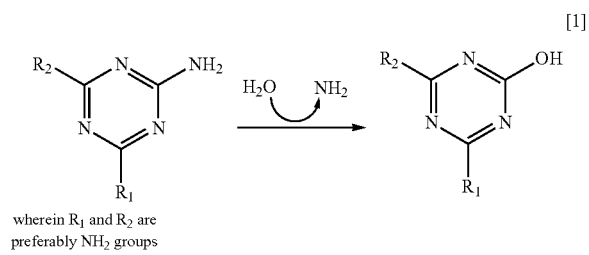

wherein $R_1$ and $R_2$ are preferably $NH_2$ groups

The "enzyme having aminohydrolase activity towards 1,3,5-triazine compounds" is also referred hereafter as "the enzyme".

In comparison with the methods of the prior art for the production of ammeline and/or ammelide, the biocatalytic process requires mild conditions. The process is carried out at moderate temperatures in the presence of an aqueous phase for the biocatalyst to remain active. The biocatalytic process is furthermore environment friendly with no use of toxic solvents, halogen-containing compounds or alcohols. The ammeline and/or ammelide directly precipitate(s) in the aqueous reaction mixture and the recovery requires only a few washing steps using water. Another advantage of the biocatalytic process is the production of the desired product without formation of by-products, e.g. cyanuric acid, resulting in a loss of yield and purity. It is envisaged that a biocatalytic method allows a better yield than the chemical routes described in the prior art. High maximum conversions of melamine to ammeline and/or ammelide (up to about 99%) are achieved. An additional advantage of the biocatalytic process compared to the synthetic routes is the ability to fine-tune the ammeline:ammelide ratio.

The conversion of melamine to ammeline and/or ammelide is said to reach its "maximum conversion" when no significant reaction occurs despite the presence of unreacted substrate and biocatalyst.

Some studies have investigated the contribution of soil bacteria to melamine toxicity in humans and animals and have led to the identification of a bacterial melamine metabolic pathway, in which melamine was shown to be hydrolyzed into ammeline and ammelide by sequential deamination. The genes and enzymes involved in these two deamination steps have been identified and in some cases, the enzymes have been purified and characterized. The latter have been found to belong to the amidohydrolase superfamily (reaction scheme [2]; J. L. Seffernick, A. G. Dodge, M. J. Sadowsky, J. A. Bumpus and L. P. Wackett. 2010. Bacterial ammeline metabolism via guanine deaminase. J. Bacteriology 192 (4), 1106-1112; A. G. Dodge, L. P. Wackett, M. J. Sadowsky. 2012. Plasmid localization and organization of melamine degradation genes in *Rhodococcus* sp. strain Mel. Applied and environmental microbiology 78 (5), 1397-1403). These studies do not relate to the technical field of the present invention, i.e. flame retardant polyamide compositions which comprise ammeline and/or ammelide and there has been no indication that the enzymes identified in the bacterial melamine metabolic pathway could be suitably used in the process according to the invention.

The first two steps from the hydrolytic degradation pathway of melamine are shown in reaction scheme [2]. The genes encoding microbial enzymes that catalyze each step are indicated. The triA, trzA, atzB genes are encoding a melamine deaminase, a s-triazine hydrolase and a hydroxyatrazine hydrolase, respectively. GDA is an abbreviation of guanine deaminase. All of the enzymes are members of the amidohydrolase superfamily.

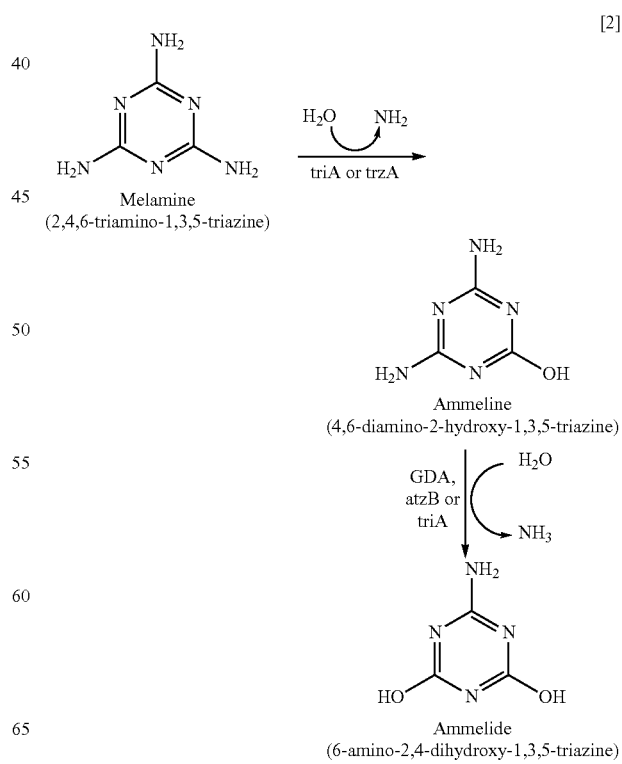

In accordance with the biocatalytic process, melamine is converted into ammeline, and optionally ammelide. This can be performed by a "dissolved-to-soluble" or by a "solid-to-solid" reaction in an aqueous reaction mixture comprising a biocatalyst. Preferably a "solid-to-solid" reaction is employed, as this has the advantage that the desired product is easily separated.

When solid-to-solid reaction is employed, effective mixing of the aqueous reaction mixture is important to provide good transport and contact of the reaction components and to avoid particle settling. A skilled person will be able to select the right mixer design and mixing conditions using commercially available techniques. Efficient mixing can for instance be done by a radial pumping stirrer, while particle settling can be avoided by an axial stirrer, pumping downward to the bottom of the reaction vessel. As axial pumping impellers narrow blade hydrofoils are used as state-of-the-art. Traditionally pitched bladed turbines as standard impellers are used. Propellers can be used in an off centered position as well. When using centered impellers, baffling can be applied to turn the flow swirling to the desired pattern of the impeller. Providing mixing by pumping the aqueous reaction mixture via an outer loop is also an option. It was surprisingly found that the enzymes used in the biocatalytic process survive the hydrodynamic shear forces which arise due to the mixing and the presence of undissolved solids.

Reaction parameters (e.g. biocatalyst, aqueous phase, mixing, pH, temperature or substrate loading) may be varied in order to optimize the reaction and to obtain the desired product.

The biocatalyst in the biocatalytic process may be used in any form. The biocatalyst may be used for example in the form of (partially) purified enzyme, lyophilized enzyme powder, immobilized enzyme, whole cells (e.g. permeabilized, freeze-dried), immobilized whole cells, cell lysate or cell free extract.

It will be clear to the skilled person that use can be made of a naturally occurring biocatalyst (wild type) or a mutant of a naturally occurring biocatalyst with suitable activity in the biocatalytic process. Properties of a naturally occurring biocatalyst may be improved by biological techniques known to the skilled person, such as molecular evolution or rational design. Mutants of wild-type biocatalysts can for example be made by modifying the encoding DNA of an organism capable of acting as a biocatalyst or capable of producing a biocatalytic moiety (e.g. an enzyme) using mutagenesis techniques known to the skilled person (e.g. random mutagenesis, site-directed mutagenesis, directed evolution, gene recombination). In particular, the DNA may be modified such that it encodes an enzyme that differs by at least one amino acid from the wild type enzyme, so that it encodes an enzyme that comprises one or more amino acid substitutions, deletions and/or insertions compared to the wild type, or such that the mutants combine sequences of two or more parent enzymes or by effecting the expression of the thus modified DNA in a suitable (host) cell. The latter may be achieved by methods known to the skilled person such as codon pair optimization, e.g. based on a method as described in WO 2008/000632.

A mutant biocatalyst may have improved properties, for instance with respect to one or more of the following aspects: selectivity towards the substrate, activity, stability, solvent tolerance, pH profile, temperature profile, substrate profile, susceptibility to inhibition, cofactor utilization and substrate-affinity. Mutants with improved properties can be identified by applying e.g. suitable high through-put screening or selection methods based on such methods known to the skilled person.

A cell, in particular a recombinant cell, comprising one or more enzymes for catalyzing the reaction step(s) in a biocatalytic process, can be constructed using molecular biology techniques, which are known in the art per se. For instance, if one or more exogenous enzymes are to be produced in a recombinant cell, such techniques can be used to provide a vector (e.g. a recombinant vector) which comprises one or more exogenous genes encoding one or more of said exogenous enzymes. One or more vectors may be used, each comprising one or more of such exogenous genes. Such vector can comprise one or more regulatory elements, e.g. one or more promoters, which may be operably linked to the gene(s) encoding the enzyme(s).

The term "exogenous" as it is used herein is intended to mean that the biomolecule (e.g. DNA, RNA, protein) is introduced into the host cell. The biomolecule can be, for example, a homologous (or heterologous) nucleic acid that encodes a homologous (or heterologous) protein following introduction into the host cell. The term "heterologous" refers to a biomolecule isolated from a donor source other than the host cell whereas the term "homologous" refers to a biomolecule isolated from the host cell. Accordingly, exogenous expression of an encoding nucleic acid of the invention can utilize either or both heterologous or homologous encoding nucleic acid.

As the inventors have found, the enzyme belonging to the amidohydrolase superfamily and having aminohydrolase activity towards 1,3,5-triazine compounds (as used in the process according to the present invention) can be any suitable enzyme (i.e. the enzyme is suitable if it can be confirmed to have aminohydrolase activity towards 1,3,5-triazine compounds) selected from the group consisting of melamine deaminase (also called melamine amidohydrolase), s-triazine hydrolase (also called N-ethylammeline chlorohydrolase), hydroxyatrazine hydrolase (also called atrazine chlorohydrolase), guanine deaminase (also called guanine amidohydrolase) and simazine chlorohydrolase.

In one embodiment, a suitable melamine deaminase might be selected from the group consisting of melamine deaminases originating from *Acidovorax, Ketogulonicigenium, Pseudomonas, Gordonia, Rhodococcus, Micrococcus, Klebsiella, Williamsia, Nocardia, Arthrobacter, Nesterenkonia, Kocuria, Dermacoccus, Kytococcus* and *Enterobacter*. In particular, said melamine deaminase might originate from *Acidovorax citrulii* (formerly called *Pseudomonas citrulii*), *Acidovorax avenae* subspecies *citrulii* (formerly called *Pseudomonas pseudoalcaligenes* subsp. *citrulii*), *Ketogulonicigenium vulgare*, *Gordonia rubripertinctus* (also called *Gordona rubripertincta*; synonym to *Rhodococcus corallinus*), *Klebsiella terragena* or *Micrococcus* sp. strain MF-1. More particularly, said melamine deaminase might originate from *Acidovorax citruffi* NRRL B-12227 or *Ketogulonicigenium vulgare* Y25.

In another embodiment, a suitable s-triazine hydrolase may be selected from the group consisting of s-triazine hydrolases originating from *Gordonia, Rhodococcus, Saccharopolyspora, Streptococcus, Streptomyces, Enterococcus, Abiotrophia, Lactococcus, Ruminococcus, Gemalla, Atopobium, Streptoverticillium, Actinoplanes, Kitasatospora, Chainia* and *Actinosporangium*. A suitable s-triazine hydrolase may in particular be selected from *Gordonia rubripertinctus* (also called *Gordona rubripertincta*; synonym to *Rhodococcus coraffinus*), more particularly from *Rhodococcus coraffinus* NRRL B-15444R.

In a further embodiment, a suitable hydroxyatrazine hydrolase may originate from *Arthrobacter, Beta proteobacterium, Pseudomonas, Aminobacter, Micrococcus, Aureobacterium, Corynebacterium, Rhodococcus, Brevibacterium, Nocardioides, Terrabacter, Comamonas, Burkholderia, Brevundimonas, Vogesella, deleya, Methylobacterium, Herbaspirillum, Hydrogenophaga* or *Pseudoalteromonas*. In particular, a suitable hydroxyatrazine hydrolase may originate from *Pseudomonas* sp. ADP or *Aminobacter aminovorans*.

In yet a further embodiment, a suitable guanine deaminase may be selected from the group consisting of guanine deaminases originating from *Bradyrhizobium, Escherichia, Rhizobium* and *Leclercia*. In particular, said guanine deaminase may originate from *Bradyrhizobium japonicum* or *Escherichia coli*. More particularly, said guanine deaminase may originate from *Bradyrhizobium japonicum* USDA 110 or *Escherichia coli* ETEC H10407.

In yet a further embodiment, a suitable simazine chlorohydrolase may be selected from the group consisting of simazine chlorohydrolases originating from *Herbaspirillum*. In particular, said simazine chlorohydrolase may originate from *Herbaspirillum* sp. B601.

In a specific embodiment, the enzyme belonging to the amidohydrolase superfamily and having aminohydrolase activity towards 1,3,5-triazine compounds comprises an amino acid sequence represented by SEQ ID NO: 5 (AAG41202.1), SEQ ID NO: 6 (YP_003963954.1), SEQ ID NO: 7 (Q52725.2), SEQ ID NO: 8 (NP_770520.1) and SEQ ID NO: 9 (CBJ02579.1) or a homologue thereof.

A "homologue" is used herein in particular for a polypeptide having a sequence identity of at least 30% with its reference protein (i.e. SEQ ID NOs: 5, 6, 7, 8 or 9), preferably at least 40%, more preferably at least 50%, more preferably at least 60%, more preferably at least 65%, more preferably at least 70%, more preferably at least 75%, more preferably at least 80%, in particular at least 85%, more in particular at least 90%, at least 91%, at least 92%, at least 93%, at least 94%, at least 95%, at least 96%, at least 97%, at least 98% or at least 99%. A homologue is generally a polypeptide that has functional and, preferably, also structural similarity to its reference protein. One type of homologue is encoded by a gene from another species of the same genus or even from other genera. "Homologue" is also intended to include those proteins which have been altered by mutagenesis techniques that have been performed to improve the protein's desired properties.

Sequence identity is herein defined as a relationship between two or more polypeptide sequences or two or more nucleic acid sequences, as determined by comparing the sequences. Usually, sequence identities are compared over the whole length of the sequences, but may however also be compared only for a part of the sequences aligning with each other. In the art, "identity" also means the degree of sequence relatedness between polypeptide sequences or nucleic acid sequences, as the case may be, as determined by the match between such sequences. Preferred methods to determine identity are designed to give the largest match between the sequences tested. In the context of this invention a preferred computer program method to determine identity between two sequences includes BLASTP and BLASTN (Altschul, S. F. et al., J. Mol. Biol. 1990, 215, 403-410, publicly available from NCBI and other sources (BLAST Manual, Altschul, S., et al., NCBI NLM NIH Bethesda, Md. 20894). Preferred parameters for polypeptide sequence comparison using BLASTP are gap open 10.0, gap extend 0.5, Blosum 62 matrix. Preferred parameters for nucleic acid sequence comparison using BLASTN are gap open 10.0, gap extend 0.5, DNA full matrix (DNA identity matrix).

The aqueous phase in the biocatalytic process is a liquid phase in which the predominant solvent is water. The aqueous phase might be water only, a buffer comprising a mixture of water and a buffering salt/buffering salts (e.g. potassium phosphate buffer), a mixture of water with an organic solvent (e.g. ethylene glycol, DMSO, THF) or mixture of buffer with an organic solvent (e.g. ethylene glycol, DMSO, THF). A skilled person will be able to select and optimize the aqueous phase for efficient activity of the biocatalyst.

In principle, the pH of the reaction medium may be chosen within wide limits, as long as the biocatalyst is active under the pH conditions applied. The pH of the reaction mixture is suitably between 4 and 11, preferably between 5 and 10. A pH selected between A and B, a pH ranging from A to B or a pH range of A to B comprises the end points A and B.

The inventors have surprisingly found that the pH has a profound effect on the ammeline:ammelide ratio. Under the conditions applied and within a pH range of 7 to 10, a higher pH resulted in a higher ammeline:ammelide ratio. In particular, pH of 7, 8, 9, 9.5 and 10 resulted in ammeline: ammelide ratios of 3.5 (75.2 mol % ammeline, 21.2 mol % ammelide), 14.3 (90.0 mol % ammeline, 6.3 mol % ammelide), 56.8 (96.5 mol % ammeline, 1.7 mol % ammelide), 108.8 (97.9 mol % ammeline, 0.9 mol % ammelide) and 164 (98.4 mol % ammeline, 0.6 mol % ammelide), respectively. An inverse trend was observed at pH values below 7, wherein a higher pH resulted in a lower ammeline:ammelide ratio. In particular, the ammeline:ammelide ratios were of 18.3 (91.5 mol % ammeline, 5.0 mol % ammelide) and 8.8 (86.9 mol % ammeline, 9.9 mol % ammelide) at a pH of 5 and 6, respectively. In other words, under the conditions applied and within a pH ranging from 6.5 and 7.5, a product with high ammelide content was obtained, whereas at pH below 6.5, preferably below 6 or at pH above 7.5, preferably above 8, a product with high ammeline content was formed. The pH has therefore been identified as an important parameter for fine-tuning the ammeline:ammelide ratio.

In principle, the temperature of the reaction medium used may be chosen within wide limits, as long as the biocatalyst remains active under the temperature conditions applied. In the biocatalytic process, the reaction temperature is normally between 0 and 100° C., preferably between 10 and 60° C.

In the preferred solid-to-solid process, the melamine substrate is added to the aqueous reaction mixture at loadings above saturation to form a solid within the temperature and pH ranges to be selected in the invention. Melamine loadings at which melamine forms a solid at a selected reaction condition can be determined by routine experiments. As meant herein, the term "loading" is the total mass of melamine initially added to the reaction mixture, relative to the total mass of the aqueous reaction mixture. The melamine loading is expressed as mass percentage (mass %). "Saturation" is defined herein as a point of maximum loading at which a solution of melamine can no more dissolve any additional amounts of melamine and such additional amounts of melamine will appear as a solid. In one embodiment of the invention, melamine is present in a loading of at least 1.0 mass %, relative to the total mass of the aqueous reaction mixture, preferably at least 10 mass %, more preferably at least 15 mass %, still more preferably at least 20 mass %, even more preferably at least 30 mass %

The inventors have surprisingly found that the substrate loading has a profound effect on the composition of the total amount of ammeline/ammelide, wherein a higher melamine loading results in a higher ammeline:ammelide ratio.

Under the conditions applied, initial melamine loadings of about 1 mass %, 9 mass % and 17.5 mass % resulted in ammeline:ammelide ratios of 108.8 (97.9 mol % ammeline, 0.9 mol % ammelide), 329.7 (98.9 mol % ammeline, 0.3 mol % ammelide), 494 (98.8 mol % ammeline, 0.2 mol % ammelide), respectively. Melamine loading has therefore been identified as another important parameter for fine-tuning the ammeline:ammelide ratio.

After the biocatalytic reaction has proceeded to an acceptable conversion level, the product can be isolated from the aqueous reaction mixture by conventional methods (e.g. by filtration, by centrifugation or by applying a decanter centrifuge). Subsequently, the isolated product can be washed with water for removal of residual melamine substrate. The ammeline:ammelide ratio is not affected by these washing steps.

The ammeline obtainable by the biocatalytic process has high ammeline and/or ammelide content and low level of residual melamine. Suitably the product comprises at least 95 mass % of ammeline and/or ammelide and at most 5 mass % of melamine. Preferably, the product comprises at least 98 mass % of ammeline and/or ammelide and at most 2 mass % of melamine. More preferably, the product comprises at least 99 mass % of ammeline and/or ammelide and at most 1 mass % of melamine.

In principle, the ammeline:ammelide ratio of the solid product can be fine-tuned within a wide range. Typically, ammeline is in excess of ammelide.

Preparation of the Composition

The flame-retardant composition can be prepared by mixing the individual ingredients in an extruder, where the resulting melt temperature lies above the highest melting temperature of the polyamide. Preferably the flame retardant is dosed after the polyamide has been molten. Preferably, the flame retardant and optionally glass fibers and/or other fillers are dosed on a side feeder.

Applications

The flame-retardant composition according to the invention can suitably be employed for applications in which flame-retardancy plays an important role. Due to the higher melting points, high-heat applications such as electronic connectors which undergo a soldering step are suitable application fields. For example IO connectors, wire-to-board connectors, FPC connectors can suitably be prepared from the flame-retardant composition according to the invention. Methods for preparing the applications include injection molding and extrusion molding. Injection molding is the preferred method for preparing applications.

EXAMPLES

PA46=polyamide with diaminobutane and adipic acid as monomers, melting temperature=295° C.
PPA=PA 4T/6T/66 copolyamide, melting temperature=325° C.
Ammeline (chemical)=Ammeline 94-98%, Ammelide 1-0.5%, Melamine 3-1%, Cyanuric acid 2-0.5%
Ammeline (biocatalytic)=Ammeline: 98.3 m/m %, Ammelide: 0.1 m/m %, Melamine: 1.2 m/m %, Water: 0.4 m/m %
Exolit OP1230=Aluminium diethyl phosphinte. Al(OPOEt2)3, commercial product from Clariant
Chemical content of both chemical and biocatalytic ammeline was determined using HPLC analysis method.

HPLC Analysis Method

Two 250 mm Prevail C18 columns were used. The critical separation takes place at 0% acetonitrile. The columns are to be equilibrated for at least 8 minutes after the gradient. The specific analytical conditions on the HPLC used are:
Columns: Prevail C18 2× (250 mm×4.6 mm ID×5 □m)
Eluent A: HClO$_4$ pH=2.0 (1.63 g 70% HClO$_4$/l water)
Eluent B: Acetonitrile
Flow: 1.2 ml/min
Injection volume: 5 µl
Column temperature: 15° C.
Detection wavelength: 195 nm

| Time (min) | % B |
|---|---|
| 0 | 0 |
| 12 | 0 |
| 12.5 | 80 |
| 13.5 | 80 |
| 14 | 0 |
| 22 | Stop |

Flammability:
UL94 Measurements were done at 0.8 mm bars, conditioned according to the norm at 48 h/23° C./50% RH and 168 h/70° C.

Bulk Density 200 grams of granules were weighted and these were converted into a graduated cylinder by a funnel. The volume is then read in milliliters, and the bulk density is calculated by dividing weight over volume weight/volume [kg/liter].

Compounding

Examples 1 and 2 according to the invention (E.1 and E.2) and comparative experiments 1 and 2 (CE.1 and CE.2) were prepared as follows. All ingredients as listed in table 1 were mixed with a ZE25 double-screw extruder, at a temperature slightly above the melting temperature of the polyamide. When using chemically produced ammeline as flame-retardant (see CE.1 and CE.2), strand breakage occurred frequently, due to foaming and evaporation, which makes this ammeline less suitable. When ammeline from a biocatalytic process was employed, much less strand breakage was observed (see E.1 and E.2). The bulk density of the compositions according to the invention was much higher, compared to the comparative examples. This indicates that less foaming occurs for the compositions according to the invention.

TABLE 1

Results

| | Experiment number | | | |
|---|---|---|---|---|
| | CE.1 | E.1 | CE.2 | E.2 |
| Components (amounts in wt. %) | | | | |
| PA46 | 39.4 | 39.4 | | |
| PPA | | | 51.4 | 51.4 |
| Glass Fibers | 30 | 30 | 30 | 30 |
| Ammeline (chemical) | 25 | | 12 | |
| Ammeline (biocat.) | | 25 | | 12 |
| Exolit OP1230 | 5 | 5 | 6 | 6 |
| Mold release and heat stabilizer package | 0.6 | 0.6 | 0.6 | 0.6 |

TABLE 1-continued

| Results | | | | |
|---|---|---|---|---|
| | Experiment number | | | |
| | CE.1 | E.1 | CE.2 | E.2 |
| Properties/performance | | | | |
| UL94 rating (0.8 mm) | V0 | V0 | V0 | V0 |
| Strand breakage during compounding (ZE25, 1 strand) | 1 per minute | 1 per hour | 1 per 2 minutes | 1 per hour |
| Bulk density | 460 | 630 | 430 | 620 |

Compositions were also made in which cyanuric acid was added (CE.3 and CE.4). These compositions also exhibited high strand breakage upon preparation, which made it unsuitable for stable processing. This illustrates the negative impact of presence of small amounts of cyanuric acid on compounding stability. Also the bulk density for CE.3 was rather low, which is due to foaming of the composition. Upon compounding the amount of cyanuric acid (CA) in the compounds was much lower, even more so after injection molding; all indicative for loss of cyanuric acid by volatilization.

TABLE 2

| Effect of cyanuric acid | | |
|---|---|---|
| | Experiment number: | |
| | CE.3 | CE.4 |
| Components (amounts in wt. %) | | |
| PA46 | 39.1 | 38.4 |
| Glass Fibers | 30 | 30 |
| Ammeline (biocatalytic) | 25 | 25 |
| Cyanuric acid | 0.3 | 1.0 |
| Exolit OP1230 | 5 | 5 |
| Mold release and heat stabilizer package | 0.6 | 0.6 |
| Properties/performance | | |
| UL94 rating (0.8 mm) | V0 | V0 |
| Strand breakage during compounding ZE25, 1 strand) | 1 per 2 minutes | continuously |
| Bulk density | 480 | Not possible (no granules) |
| CA after compounding | 0.11 | <0.1 |
| CA after injection molding | <0.05 | — |

The invention claimed is:

1. A flame-retardant polyamide composition comprising an aliphatic or semi-aromatic polyamide with a melting temperature higher than 265° C., and
   4 to 25 wt % ammeline and/or ammelide relative to the total weight of the composition, wherein the ammeline and/or ammelide is obtained by a biocatalytic process that converts melamine into ammeline, and optionally further into ammelide, in an aqueous reaction mixture comprising a biocatalyst,
   wherein the composition comprises less than 0.5 wt % cyanuric acid, relative to the total weight of ammeline and ammelide, and at most 2 wt % melamine relative to the total weight of ammeline and ammelide of the composition; and
   wherein the biocatalyst comprises at least one enzyme that belongs to the amidohydrolase superfamily, has aminohydrolase activity towards 1,3,5-triazine compounds, and comprises an amino acid sequence with at least about 90% identity to SEQ ID NO: 5, SEQ ID NO: 6, SEQ ID NO: 7, SEQ ID NO: 8, or SEQ ID NO: 9.

2. The flame-retardant polyamide composition of claim 1, wherein the at least one enzyme comprises an amino acid sequence selected from the group consisting of SEQ ID NO: 5, SEQ ID NO: 6, SEQ ID NO: 7, SEQ ID NO: 8, and SEQ ID NO: 9.

3. The flame-retardant polyamide composition of claim 1, wherein the polyamide is selected from the group consisting of:
   polyamide 46;
   polyamide 6/6T;
   polyamide 66/6T;
   polyamide 6T/66;
   polyamide 6T/10T;
   polyamide 66/6/6T;
   polyamide 4T/6T/66;
   polyamide 66/6I/6T;
   polyamide XT;
   or mixtures thereof;
   wherein X is a diamine with 5, 6, 7, 8, 9, or 10 carbon atoms, or a combination thereof; and
   wherein T is terephthalic acid.

4. The flame-retardant polyamide composition of claim 1, wherein the composition further comprises glass fibers in an amount of between 5 to 40 wt % relative to the total weight of the composition.

5. The flame-retardant polyamide composition of claim 1, wherein the composition further comprises a phosphorous flame retardant.

6. The flame-retardant polyamide composition of claim 5, wherein the phosphorous flame retardant is present in an amount between 0.5 and 20 wt %, relative to the total weight of the composition.

7. The flame-retardant polyamide composition according to claim 5, wherein the phosphorous flame retardant comprises an organic phosphorus compound that is present in the composition in an amount between 2 to 10 wt %, relative to the total weight of the composition.

8. The flame-retardant polyamide composition of claim 1 wherein the flame-retardant is halogen-free.

* * * * *